United States Patent
Inagaki (10) Patent No.: US 11,261,269 B2
(45) Date of Patent: *Mar. 1, 2022

(54) FLAME RETARDANT, METHOD OF MANUFACTURING THE SAME, RESIN COMPOSITION OF MATTER, AND METHOD OF MANUFACTURING THE SAME

(71) Applicant: Sony Corporation, Tokyo (JP)

(72) Inventor: Yasuhito Inagaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 16/801,989

(22) Filed: Feb. 26, 2020

(65) Prior Publication Data

US 2020/0190231 A1    Jun. 18, 2020

Related U.S. Application Data

(62) Division of application No. 15/358,521, filed on Nov. 22, 2016, now Pat. No. 10,982,021, which is a division of application No. 12/672,793, filed as application No. PCT/JP2008/064451 on Aug. 12, 2008, now abandoned.

(30) Foreign Application Priority Data

Aug. 20, 2007   (JP) ................................. 2007-213413

(51) Int. Cl.
| | |
|---|---|
| C08F 8/36 | (2006.01) |
| C08L 69/00 | (2006.01) |
| C09K 21/14 | (2006.01) |
| C08J 7/12 | (2006.01) |
| C08L 101/02 | (2006.01) |

(52) U.S. Cl.
CPC .................. C08F 8/36 (2013.01); C08J 7/12 (2013.01); C08L 69/00 (2013.01); C09K 21/14 (2013.01); C08F 2800/10 (2013.01); C08F 2800/20 (2013.01); C08L 101/02 (2013.01); C08L 2201/02 (2013.01); C08L 2205/025 (2013.01); C08L 2205/03 (2013.01); C08L 2205/035 (2013.01)

(58) Field of Classification Search
None
See application file for complete search history.

(56) References Cited

U.S. PATENT DOCUMENTS

| | | | |
|---|---|---|---|
| 2,945,842 A | 7/1960 | Eichhorn et al. | |
| 4,220,739 A | 9/1980 | Walles | |
| 4,448,935 A | 5/1984 | Iovine et al. | |
| 5,459,210 A * | 10/1995 | Kihara | C08F 212/08 |
| | | | 526/228 |
| 5,849,818 A | 12/1998 | Walles et al. | |
| 6,664,340 B1 | 12/2003 | Kaerki et al. | |
| 7,910,673 B2 | 3/2011 | Wakiyama et al. | |
| 10,982,021 B2 * | 4/2021 | Inagaki | C08F 8/36 |
| 2007/0181859 A1 | 8/2007 | Yasohito | |
| 2009/0306275 A1 | 12/2009 | Inagaki | |

FOREIGN PATENT DOCUMENTS

| | | |
|---|---|---|
| EP | 1728823 | 12/2006 |
| EP | 1728823 A1 | 12/2006 |
| EP | 2133390 | 12/2009 |
| GB | 1280349 A | 7/1972 |
| JP | 2001-181342 | 7/2001 |
| JP | 2001-181444 | 7/2001 |
| JP | 2005-272537 | 10/2005 |
| JP | 2005-272538 | 10/2005 |
| JP | 2005-272539 | 10/2005 |
| JP | 2005272538 A | 10/2005 |

OTHER PUBLICATIONS

Li, Thermal, Physical and Chemical Stability of Porous Polystyrene-Type Beads with Different Degrees of Crosslinking; Polymer Degradation and Stability 73 (2001) pp. 163-167. (Year: 2001).*
Antonetti, Properties of Fractal Divinylbenzene Microgels; Macromolecules 24 (1991) pp. 3434-3442. (Year: 1991).*
International Search Report dated Nov. 25, 2008.
Patterson, J.A., "Preparation of Cross-Linked Polystyrenes and Their Derivatives For Use As Solid Supports or Insoluble Reagents", Biochemical; Aspects of Reactions on Solid Supports, Jan. 1, 1971, pp. 189-213.
European Search Report and European Supplemental Report issued in connection with related European Patent Application No. EP 08792384.3 dated Oct. 13, 2013.
Li; Thermal, Physical and Chemical Stability of Porous Polystyrene-Type Beads with Different Degrees of Crosslinking, Polymer Degradation and Stability, vol. 73 (2001) pp. 163-167.

(Continued)

*Primary Examiner* — David J Buttner (74) *Attorney, Agent, or Firm* — Dentons US LLP (57) ABSTRACT

A flame retardant with which fire retardancy is improved and the fire retardancy is able to be secured stably for a long time is provided. An internal layer 11 containing a polymer and a flame retardant factor layer 12 that is formed outside of the internal layer 11 and that contains a polymer to which at least one of a sulfonate group and a sulfonate base is bonded are included. Thereby, compared to a case that the flame retardant factor layer 12 is not included, moisture is hardly absorbed, and respective particles of the flame retardant are inhibited from being adhered to each other. Accordingly, blocking is inhibited.

20 Claims, 5 Drawing Sheets

(56) References Cited

OTHER PUBLICATIONS

Antonietti, Properties of Fractal Divinylbenzene Microgels: Macromolecules 24 (1991) pp. 3434-3442.
United States Office Action issued in related U.S. Appl. No. 16/802,027 dated Jun. 29, 2021.

* cited by examiner

FIG. 5

FLAME RETARDANT, METHOD OF MANUFACTURING THE SAME, RESIN COMPOSITION OF MATTER, AND METHOD OF MANUFACTURING THE SAME

RELATED APPLICATION DATA

This application is a divisional of U.S. patent application Ser. No. 15/358,521 filed Nov. 22, 2016, now U.S. Pat. No. 10,982,021 issued Apr. 20, 2021, which is a divisional of U.S. patent application Ser. No. 12/672,793 filed Feb. 9, 2010, now abandoned, the entireties of which are incorporated herein by reference to the extent permitted by law. U.S. patent application Ser. No. 12/672,793 is the Section 371 National Stage of PCT/JP2008/064451 filed Aug. 12, 2008. The present application claims the benefit of priority to Japanese Patent Application No. JP 2007-213413 filed on Aug. 20, 2007 in the Japan Patent Office, the entirety of which is incorporated by reference herein to the extent permitted by law.

TECHNICAL FIELD

The present invention relates to a flame retardant, a method of manufacturing the same, a resin composition of matter containing a flame retardant, and a method of manufacturing the same.

BACKGROUND ART

In recent years, since a resin composition of matter such as a rubber and a plastic has superior moldability and superior impact resistance, the resin composition of matter is widely used for home electric appliances, auto parts and the like. Accordingly, a resin composition of matter having high durability, high safety and the like has been demanded. Specially, improving fire safety has been desired. For example, a technology to give fire retardancy to the resin composition of matter has been progressively developed.

As a technology to give fire retardancy to the resin composition of matter, a method of containing a resin-use flame retardant into the resin composition of matter has been considered. Examples of the resin-use flame retardant include a metal hydroxide system (magnesium hydroxide and aluminum hydroxide) flame retardant, a silicon system (silicon and silica) flame retardant, a halogen (bromine) system flame retardant, and a phosphorus system (ester phosphate, red phosphorus and the like) flame retardant. However, in the case where the metal hydroxide system flame retardant is used, the additive amount thereof to the resin composition of matter is increased, and thus there is a problem that the mechanical characteristic are easily lowered. In the case where the halogen system flame retardant is used, there is a problem that the impact strength of the resin composition of matter is easily lowered. Further, for the silicon system flame retardant, its applicable resin composition of matter is limited, and thus there is a problem that its use application is limited.

Therefore, of the foregoing flame retardants, the phosphorus system flame retardant is currently attracts attention. However, in the case where the phosphorus system flame retardant is used, there is a problem that gas is generated in injection-molding the resin composition of matter, and impact resistance and heat resistance are easily lowered.

Further, currently, a technology to give fire retardancy to a resin composition of matter by using a sulfonated polymer having an aromatic ring as a flame retardant, and containing the same together with a polycarbonate resin or the like into the resin composition of matter has been proposed (for example, refer to Patent Documents 1 to 5).

Patent Document 1 Japanese Unexamined Patent Application Publication No. 2001-181342
Patent Document 2 Japanese Unexamined Patent Application Publication No. 2001-181444
Patent Document 3 Japanese Unexamined Patent Application Publication No. 2005-272537
Patent Document 4 Japanese Unexamined Patent Application Publication No. 2005-272538
Patent Document 5 Japanese Unexamined Patent Application Publication No. 2005-272539

DISCLOSURE OF INVENTION

However, in the technologies described in the foregoing Patent Documents 1 to 5, the flame retardant easily absorbs moisture, and thus blocking is easily generated. It results in a problem that in manufacturing a resin composition of matter including the flame retardant, dispersion is hardly realized. Further, in the manufactured resin composition of matter, there is a problem that the physical property is hardly lowered associated with moisture absorption.

In the recent home electric appliances, auto parts and the like, their light weight and design characteristics are regarded as important characteristics. Thus, a resin composition of matter with high workability tends to be more widely used. Thus, it has been aspired to secure the physical properties of the resin composition of matter stably for a long time, to improve the safety, and in particular, to further improve the flame retardant.

In view of the foregoing problem, it is an object of the present invention to provide a flame retardant with which fire retardancy is able to be improved and the fire retardancy is able to be secured stably for a long time, a method of manufacturing the same, a resin composition of matter, and a method of manufacturing the same.

A flame retardant of the present invention is a flame retardant containing a particulate polymer, wherein at least one of a sulfonate group and a sulfonate base is bonded to a surface layer section of the polymer. Further, a resin composition of matter of the present invention contains a resin and the foregoing flame retardant.

In a method of manufacturing a flame retardant of the present invention, a particulate polymer having a moisture content of 3.5 wt % or less is sulfonated, and thereby at least one of a sulfonate group and a sulfonate base is bonded to a surface layer section. Further, in a method of manufacturing a resin composition of matter of the present invention, a resin and a flame retardant manufactured by the foregoing method are contained.

According to the flame retardant and the resin composition of matter containing the same of the present invention, the flame retardant contains the particulate polymer, and at least one of the sulfonate group and the sulfonate base is bonded to a surface layer section of the polymer. Thus, even if being exposed under high humidity environment, moisture absorption is inhibited. Thereby, fire retardancy is improved, and the fire retardancy is able to be secured stably for a long time.

According to the method of manufacturing a flame retardant and the method of manufacturing a resin composition of matter containing the flame retardant manufactured by the same of the present invention, the particulate polymer having the moisture content of 3.5 wt % or less is sulfonated, and at least one of the sulfonate group and the sulfonate base is bonded to the surface layer section, and thereby the flame retardant is formed. Thus, the particles of the flame retardant are hardly adhered to each other and are easily dispersed uniformly, and thus compatibility is improved. Thereby, the resin composition of matter which has superior fire retardancy and in which the fire retardancy is secured stably for a long time is able to be stably manufactured.

BRIEF DESCRIPTION OF DRAWINGS

The patent or application file contains at least one drawing executed in color. Copies of this patent or patent application publication with color drawing(s) will be provided by the Office upon request and payment of the necessary fee.

BEST MODE(S) FOR CARRYING OUT THE INVENTION

A description will be hereinafter given in detail of an embodiment of the present invention with reference to the drawings.

Figure 1:
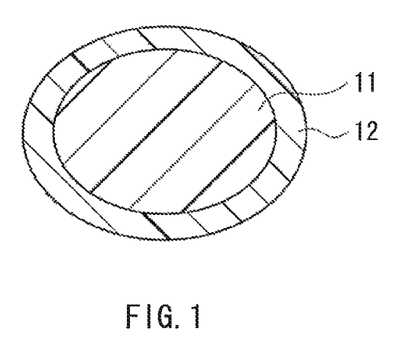
FIG. 1 is a cross sectional view illustrating a structure of a flame retardant according to an embodiment of the present invention.

FIG. 1 illustrates a cross sectional structure of a flame retardant according to an embodiment of the present invention. The flame retardant is intended to give fire retardancy to a resin composition of matter, and has a particulate internal layer 11. Outside of the internal layer 11, a flame retardant factor layer 12 is formed.

The internal layer 11 is composed of a polymer. The polymer is able to be voluntarily set, but may have at least one selected from the group consisting of aromatic rings and double bonds.

Examples of polymers include polystyrene (PS), high impact polystyrene (HIPS: styrene-butadiene copolymer), an acrylonitrile-styrene copolymer (AS), an acrylonitrile-butadiene-styrene copolymer (ABS), an acrylonitrile-chlorinated polyethylene-styrene resin (ACS), an acrylonitrile-styrene-acrylate copolymer (ASA), an acrylonitrile-ethylene propylene rubber-styrene copolymer (AES), an acrylonitrile-ethylene-propylene-diene-styrene resin (AEPDMS), polycarbonate (PC), polyphenylene oxide (PPO), polyethylene terephthalate (PET), polybutylene terephthalate (PBT), polysulfone (PSF), polyactate (PLE), natural rubber (NR), isoprene rubber (IR), butadiene rubber (BR), chloroprene rubber (CR), nitrile rubber (NBR), hydroxylated nitrile rubber (HNBR), butyl rubber (IIR), ethylene rubber (EPDM), silicon rubber (Q), and thermoplastic elastomer (TPE). One thereof may be used singly, or a mixture (alloy) obtained by mixing a plurality thereof may be used. Examples of mixtures (alloys) include an ABS/PC alloy, a PS/PC alloy, an AS/PC alloy, a HIPS/PC alloy, a PET/PC alloy, a PBT/PC alloy, a PVC/PC alloy, a PLA/PC alloy, a PPO/PC alloy, a PS/PPO alloy, a HIPS/PPO alloy, an ABS/PET alloy, and a PET/PBT alloy. Specially, polystyrene, high impact polystyrene, an acrylonitrile-styrene copolymer, an acrylonitrile-butadiene-styrene copolymer, an acrylonitrile-chlorinated polyethylene-styrene resin, an acrylonitrile-styrene-acrylate copolymer, an acrylonitrile-ethylene propylene rubber-styrene copolymer, an acrylonitrile-ethylene-propylene-diene-styrene resin, polycarbonate, polyphenylene oxide, polyethylene terephthalate, polybutylene terephthalate, or polysulfone is preferable. Examples of the polymers include a thermoplastic resin and a thermoset resin. The thermoplastic resin is preferable, since if the thermoplastic resin is contained in a resin composition of matter, high compatibility is able to be obtained.

The flame retardant factor layer 12 formed in the surface layer section of the flame retardant contains a polymer with which at least one of a sulfonate group (—$SO_3H$) and a sulfonate base (hereinafter referred to as the sulfonate group or the like) is bonded as a flame retardant factor. The polymer is structured similarly to the polymer contained in the internal layer 11. That is, the flame retardant factor layer 12 is formed by binding the sulfone group or the like to the surface layer section of the particulate polymer. The flame retardant factor layer 12 may be formed to cover the whole area of the internal layer 11, may be formed in part of the outside of the internal layer 11, or may be formed in a state other than lamination. Since the flame retardant factor layer 12 is provided in the surface layer section of the flame retardant, even if the flame retardant is exposed under high humidity environment, moisture hardly penetrates into the internal section, moisture absorption is inhibited, particles of the flame retardant are hardly adhered to each other, and blocking is inhibited. Thus, in the case where the flame retardant is contained in a resin composition of matter, handling characteristics and dispersiveness are improved, and compatibility is also improved. Therefore, fire retardancy of the resin composition of matter is improved with a small additive amount, and long-term stability of physical properties such as fire retardancy and mechanical strength is secured.

The sulfonate group or the like is a flame retardant factor to appropriate give fire retardancy. The sulfonate group or the like may be uniformly bonded with the polymer, or may be ununiformly bonded with the polymer. The occupancy ratio of sulfur (S) in the sulfonate group or the like to the whole flame retardant is preferably from 0.1 wt % to 10 wt % both inclusive, since thereby high effect is obtained. More specifically, if the occupancy ratio of sulfur (S) in the sulfonate group or the like to the whole flame retardant is under 0.1 wt %, fire retardancy is hardly given to the resin composition of matter stably. Meanwhile, if the occupancy ratio of sulfur (S) in the sulfonate group or the like to the whole flame retardant exceeds 10 wt %, compatibility may be lowered, and mechanical strength of the resin composition of matter containing the flame retardant may be hardly retained stably. Specially, the occupancy ratio of sulfur in the sulfonate group or the like is preferably from 0.3 wt % to 7.5 wt % both inclusive, and is more preferably from 0.5 wt % to 5 wt % both inclusive, since thereby high effect is obtained.

The occupancy ratio of sulfur in the sulfonate group or the like to the flame retardant is able to be calculated by, for example, combustion flask method. Further, for example, such a ratio is able to be measured by treating the sulfonate group or the like with a metal ion or the like to obtain a salt, and determining quantity of the metal ion.

Examples of the sulfonate group or the like include a sulfonate metal base as a sulfonate base and a group in which a sulfonate group is neutralized with ammonia or an amine compound, in addition to the sulfonate group. Examples of sulfonate metal bases include a sulfonate sodium (Na) base, a sulfonate potassium (K) base, a sulfonate lithium (Li) base, a sulfonate calcium (Ca) base, a sulfonate magnesium (Mg) base, a sulfonate aluminum (Al) base, a sulfonate zinc (Zn) base, a sulfonate antimony (Sb) base, and a sulfonate tin (Sn) base. Further, examples of groups in which a sulfonate group is neutralized with ammonia or an amine compound include a sulfonate ammonium base. One thereof may be bonded with the polymer, or two or more thereof may be bonded with the polymer. Specially, as the sulfonate group or the like, the sulfonate metal base is preferable, since thereby higher effect is obtained. As the sulfonate metal base, specially, the sulfonate sodium base, the sulfonate potassium base, or the sulfonate calcium base is preferable.

In the flame retardant, the thickness of the flame retardant factor layer 12 is voluntarily set, but the thickness ratio of the flame retardant factor layer 12 is preferably 50% or less to the particle diameter of the flame retardant, since thereby blocking is inhibited and high handling characteristics are obtained. Thereby, in the case where the flame retardant is contained in a resin composition of matter, favorable compatibility is obtained, and high fire retardancy is given even if the content thereof is small. Further, in this case, moisture absorption is inhibited, and thus long term stability of the physical properties are secured. Specially, the thickness ratio of the flame retardant factor layer 12 is preferably 30% or less to the particle diameter of the flame retardant, more preferably 20% or less to the particle diameter of the flame retardant, and much more preferably 10% or less to the particle diameter of the flame retardant, since thereby higher effect is obtained.

Figure 2:
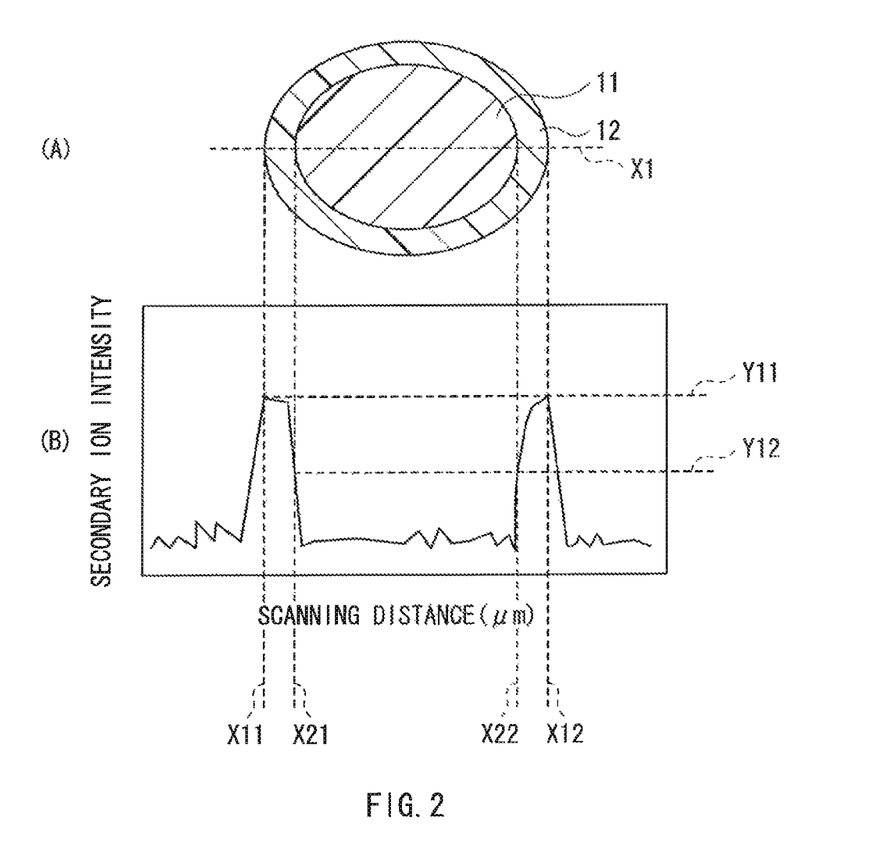
FIG. 2 is a schematic view illustrating a relation between a cross sectional structure of the flame retardant illustrated in FIG. 1 and a distribution of secondary ion intensity.

The "thickness ratio of the flame retardant factor layer 12" is able to be measured by using TOF-SIMS (Time of Flight-Secondary Ion Mass Spectrometry). A description will be herein given of the "thickness ratio of the flame retardant factor layer 12" with reference to FIG. 2 by taking a case measured by using TOF-SIMS as an example. FIG. 2(A) schematically illustrates a cross sectional structure in the approximate center of the flame retardant. FIG. 2(B) schematically illustrates a distribution of secondary ion intensity of sulfur element in the case that measurement is made along dotted line X1 of FIG. 2(A). The horizontal axis represents a scanning distance (μm), and the vertical axis represents the secondary ion intensity. In the case where the secondary ion intensity of sulfur element is measured while the cross section of the flame retardant is scanned along dotted line X1 of FIG. 2(A) by using TOF-SIMS, as illustrated in FIG. 2(B), due to sulfur in the sulfonate group or the like contained in the flame retardant factor layer 12, two high peaks are detected. In this case, where positions of outer edges of the flame retardant are scanning distances X11 and X12 in a maximum value Y11 of the secondary ion intensity of the two peaks, the particle diameter (μm) of the flame retardant is calculated from the difference (scanning distance X12-scanning distance X11). Further, where positions of the interface between the flame retardant factor layer 12 and the internal layer 11 are scanning distances X21 and X22 that are located between the scanning distances X11 and X12 and that correspond to Y12 as a 50% value of the maximum value Y11, the diameter (μm) of the internal layer 11 is calculated from the difference (scanning distance X22-scanning distance X21). From the particle diameter of the flame retardant and the diameter of the internal layer 11, the thickness ratio of the flame retardant factor layer 12 (%)=[(the particle diameter of the flame retardant—the diameter of the internal layer 11)/the particle diameter of the flame retardant]*100 is calculated. It is needless to say that the measurement method and the calculation method of the thickness ratio of the flame retardant factor layer 12 are not limited to the foregoing measurement method and the foregoing calculation method, but any measurement method and any calculation method may be used as long as calculation is enabled.

Next, a description will be given of an example of a method of manufacturing a flame retardant in this embodiment with reference to the flowchart of FIG. 3.

First, for example, the polymer is pulverized (step S101) to obtain particles.

The polymer to be pulverized preferably has at least one selected from the group consisting of aromatic rings and double bonds, since thereby introducing the sulfonate group or the like is facilitated in after-mentioned sulfonation treatment. The content of the aromatic ring and the double bond in the polymer is preferably from 1 mol % to 100 mol % both inclusive. In this case, the sulfonate group or the like is more sufficiently introduced than in the case that the content is out of the foregoing range. Specifically, the content of the aromatic ring and the double bond in the polymer is preferably from 2 mol % to 100 mol % both inclusive, and more preferably from 50 mol % to 100 mol % both inclusive, since thereby higher effect is obtained. It is enough that the polymer has one of aromatic rings and double bonds, but may have two or more thereof. In the latter case, the composition ratio is voluntarily set, but the amount of aromatic rings is more preferably larger in view of manufacturing.

The weight average molecular weight of the polymer is preferably from 5000 to 20000000 both inclusive, since thereby favorable mechanical characteristics and favorable heat resistance are obtained in the flame retardant. More specifically, in the case where the weight average molecular weight is under 5000, mechanical characteristics and heat resistance in the flame retardant are easily lowered. Meanwhile, in the case where the weight average molecular weight exceeds 20000000, sufficient dispersiveness is hardly obtained when the flame retardant is contained into the resin composition of matter. Specially, the weight average molecular weight of the polymer is preferably from 10000 to 1000000 both inclusive, and is more preferably from 50000 to 500000 both inclusive, since thereby high effect is obtained.

Examples of the polymer include, for example, a polymer similar to the polymer contained in the foregoing internal layer 11. Further, as the polymer, for example, a used recycled material or mill ends generated in manufacturing a polymer may be used. Thereby, effective use of resources and low cost are able to be realized.

Examples of methods of pulverizing the polymer include a frost shattering method with the use of a liquid nitrogen. The pulverized polymer preferably contains 30 wt % or more of particles being 60 mesh (250 μm) or less in size, and contains 10 wt % or more of particles being 80 mesh (180 μm) or less in size, since thereby the sulfonate group or the like is favorably introduced in sulfonation treatment. More specifically, in the case where the particle diameter is 60 mesh or more, the surface area of the particle is decreased, and thus the introduction amount of the sulfonate group or the like is lowered in sulfonation treatment. Further, in this case, when the manufactured flame retardant is contained into the resin composition of matter, there is a possibility that dispersion is easily nonuniform, and sufficient fire retardancy is not able to be obtained. Meanwhile, in the case where the particle diameter is small, there is no particular problem in sulfonation treatment. However, in this case, since the particle diameter of the flame retardant is small, dust countermeasure is desirably taken according to needs. Specially, in the particle, it is preferable that 50 wt % or more of the particles being 60 mesh or less in size is contained, and 30 wt % or more of the particles being 80 mesh or less in size is contained. It is more preferable that 70 wt % or more of the particles being 60 mesh or less in size is contained, and 50 wt % or more of the particles being 80 mesh or less in size is contained, since thereby higher effect is obtained.

In the case where a particulate polymer is able to be prepared, pulverization treatment is not needed. In this case, when the polymer is manufactured from a monomer, in various polymerization methods (for example, suspension polymerization, mass polymerization, pearl polymerization and the like), particle production may be made according to the conditions in the polymerization step to adjust the particle diameter.

Subsequently, whether or not the moisture content of the pulverized polymer is 3.5 wt % or less is checked (step S102). In the case where the moisture content exceeds 3.5 wt % (N of S102), the pulverized polymer is dried (step S103), and after that, the moisture content is rechecked. The moisture content of the pulverized polymer is preferably 3.5 wt % or less, since the sulfonate group or the like is able to be introduced favorably and stably in sulfonation treatment. More specifically, in the case where the moisture content exceeds 3.5 wt %, moisture is adhered to the surface of the particulate polymer, and water coat is formed. Thereby, a sulfonating agent to be used in sulfonation treatment and water are previously reacted, reaction with polymer is inhibited, and thereby the sulfonate group or the like is hardly introduced. Thus, sulfonation treatment varies according to each particle of the polymer, and there is a possibility that sufficient fire retardancy is not obtained in a resin composition of matter including the flame retardant. Specially, the moisture content is preferably 2 wt % or less, and more preferably 1 wt % or less, since thereby high effect is obtained.

Subsequently, in the case where the moisture content of the pulverized polymer is 3.5 wt % or less (Y of S102), sulfonation treatment is performed for the particulate polymer by using the sulfonating agent (step S104). Thereby, the flame retardant factor layer 12 is formed in the surface layer section of the particulate polymer.

Examples of the sulfonating agents include sulfur trioxide, fuming sulfuric acid, chlorosulfonic acid, concentrated sulfuric acid, and polyalkylbenzene sulfone acid. One thereof may be used singly, or a plurality thereof may be used by mixture. Further, as the sulfonating agent, a complex with a Lewis base such as alkyl ester phosphate and dioxane may be used. In the case where the polymer has a substituent group that is easily hydrolyzed such as a cyano group, if moisture is contained in the sulfonating agent, hydrolysis reaction (side reaction) is initiated independently from sulfonation reaction (main reaction). Thereby, hydrolysis reaction of the substituent group such as a cyano group is promoted. That is, by inhibiting sulfonation reaction, the introduction amount of the sulfonate group or the like is lowered. Thus, as the sulfonating agent, an agent in which the amount of moisture is small as much as possible is preferable. Specifically, sulfur trioxide, fuming sulfuric acid, chlorosulfonic acid, concentrated sulfuric acid, polyalkylbenzene sulfone acid or the like is preferable. A rough standard of the moisture content in the sulfonating agent is, for example, 3 wt % or less, and is preferably 1 wt % or less.

The method of sulfonation treatment is able to be voluntarily set as long as a method is able to realize reaction between the particulate polymer and the sulfonating agent. For example, examples thereof include the following first to third methods. In the first method, for example, the particulate polymer is dispersed into an organic solvent. After that, a given amount of a sulfonating agent (for example, a liquid sulfonating agent or a gas sulfonating agent) is added to initiate sulfonation reaction. In the second method, for example, the particulate polymer is directly put into the sulfonating agent to initiate sulfonation reaction. In the third method, for example, sulfonation gas (for example, sulfur trioxide: $SO_3$ gas) is directly sprayed to the particulate polymer, and thereby sulfonation reaction is initiated. Specially, the first method or the third method is preferable. In particular, in the light of not using an organic solvent (for realizing environmental conservation and low cost), the third method is more preferable.

In performing sulfonation treatment, the occupancy ratio of sulfur in the sulfonate group or the like to the whole flame retardant is preferably adjusted to from 0.1 wt % to 10 wt % both inclusive. Otherwise, the thickness ratio of the flame retardant factor layer 12 to the particle diameter of the flame retardant is preferably adjusted to 50% or less. Thereby, high effect in the flame retardant is obtained. In this case, the introduction ratio of the sulfonate group or the like is able to be voluntarily adjusted by the particle diameter (surface area) of the polymer, the additive amount of the sulfonating agent, time for sulfonation reaction, temperature or pressure at the time of sulfonation reaction, or type or the additive amount of Lewis base or the like. Specially, adjustment is preferably made by the particle diameter of the polymer, the additive amount of the sulfonating agent, time for sulfonation reaction, reaction temperature and the like.

Subsequently, the sulfur portion is measured to check whether or not sulfonation treatment has been favorably performed, or whether or not a given amount of the sulfonate group or the like has been introduced (step S105). At this time, it is possible that the sulfur portion is measured or the sulfur portion is not measured. In the case where the sulfur portion is not measured, measurement may be made after the flame retardant is completed. After that, the polymer in which the flame retardant factor layer 12 is formed is provided with neutralization treatment by using an alkali water solution (step S106). Thereby, the sulfonating agent is neutralized, and sulfonation reaction is stopped.

Finally, separation from the neutralization solution is made by filtration or the like and thereby the resultant is taken out, and then is dried (step S107). Thereby, the foregoing flame retardant is completed.

In the flame retardant, for example, in the case where temperature is increased to the degree that flame is approximated, binding between the polymer and the sulfonate group or the sulfonate base is split off, and radical is generated. Thereby, in the case where the flame retardant is contained in the resin composition of matter, the resultant becomes hardly fired. Further, in this flame retardant, the sulfonate group or the like is introduced to the surface layer section. Thus, in the case of being exposed under high humidity environment, moisture is hardly penetrated into the internal section, and moisture absorption is inhibited. Thereby, particles of the flame retardant are hardly adhered to each other. Thus, in the case where the flame retardant is contained in the resin composition of matter, handling characteristics and dispersiveness are improved. Further, in the formed resin composition of matter, compatibility is improved, and moisture is hardly absorbed.

The flame retardant includes the particulate polymer and the flame retardant factor layer 12 formed by binding at least one of the sulfone group and the sulfone base to the surface layer section of the polymer. Thus, compared to a flame retardant in which the sulfone group or the like is penetrated into the internal section of the particles and is introduced therein entirely, the flame retardant of this embodiment is able to more contribute to improving fire retardancy of the resin composition of matter with a small additive amount. Further, even if being exposed under high humidity environment, blocking is inhibited. Thus, in the case where the flame retardant is contained in the resin composition of matter, moisture absorption is inhibited, resulting in contribution to securing fire retardancy stably for a long time. Further, in this case, the flame retardant is also able to contribute to securing the physical properties such as mechanical strength stably for a long time.

Further, in the case where the polymer has at least one of aromatic rings and double bonds, or contains a thermoplastic resin, high effect is obtained.

Further, in the case where the occupancy ratio of sulfur in at least one of the sulfonate group and the sulfonate base to the whole flame retardant is from 0.1 wt % to 5 wt % both inclusive, or the thickness ratio of the flame retardant factor layer 12 is 50% or less, higher effect is obtained.

According to the method of manufacturing the flame retardant, the moisture content is 3.5 wt % or less, and the particulate polymer is sulfonated. Thus, inhibiting sulfonation reaction resulting from a state that moisture is adhered to the surface of the particulate polymer is inhibited. Thereby, the flame retardant factor layer 12 is able to be formed stably.

Next, a description will be given of a resin composition of matter of this embodiment.

In the resin composition of matter, the foregoing flame retardant is contained in the resin. The resin composition of matter is used for, for example, home electric appliances, auto parts, business equipment, stationery, groceries, architectural materials, fibers and the like.

The resin is able to be set voluntarily. Specific examples thereof include polycarbonate (PC), an acrylonitrile-butadiene-styrene copolymer (ABS), polystyrene (PS), a styrene-butadiene copolymer (HIPS: high impact polystyrene), an acrylonitrile-styrene copolymer (AS), polyvinyl chloride (PVC), polyphenylene oxide (PPO), polyethylene terephthalate (PET), polybutylene terephthalate (PBT), polysulfone (PSF), thermoplastic elastomer (TPE), polybutadiene (PB), polyisoprene (PI), nitrile rubber (acrylonitrile-butadiene rubber), nylon, and polyactic acid (PLA). One thereof may be used singly, or a mixture (alloy) obtained by mixing a plurality thereof may be used. Specially, one or more of the foregoing resins are preferably contained at a ratio of 5 wt % or more. In particular, polycarbonate, an acrylonitrile-butadiene-styrene copolymer, an acrylonitrile-styrene copolymer, a PC/TPE alloy, an ABS/PC alloy, an AS/PC alloy, a PC/PBT alloy, a PC/HIPS alloy, a PC/PLA alloy, a PVC/PC alloy, a PET/PC alloy, a PPO/PC alloy, a HIPS/PPO alloy, a HIPS/ABS/PET alloy, a PET/PBT alloy or the like is preferable. Specially, polycarbonate or an alloy of a thermoplastic polymer containing polycarbonate is more preferable. In the case where the foregoing material is contained together with the aforementioned flame retardant, sufficient effect is obtained.

Further, as the resin, in addition to the foregoing material, a used recycled material or mill ends generated in manufacturing a resin may be used. Thereby, effective use of resources and low cost are able to be realized.

The resin composition of matter contains the foregoing flame retardant.

Thereby, even if the content thereof is small, fire retardancy is improved, and the fire retardancy is secured stably for a long time. Herewith, even if being exposed under high humidity environment, the inherent physical properties of the resin are retained stably for a long time without ruining the inherent physical properties of the resin. The content of the foregoing flame retardant is preferably from 0.001 wt % to 10 wt % both inclusive, since thereby sufficient effect is obtained. More specifically, there is a tendency as follows. In the case where the content of the foregoing flame retardant is smaller than 0.001 wt %, it becomes difficult to stably demonstrate fire retardancy. Meanwhile, in the case where the content of the foregoing flame retardant is larger than 10 wt %, fire retardancy is lowered. Specially, the content of the flame retardant is preferably from 0.01 wt % to 5 wt % both inclusive, and is more preferably from 0.1 wt % to 3 wt % both inclusive, since thereby high effect is obtained.

The flame retardant may contain other flame retardant according to needs in addition to the foregoing flame retardant. Examples of other flame retardants include known flame retardants such as an organophosphate ester system flame retardant, a halogenated ester phosphate system flame retardant, an inorganic phosphorus system flame retardant, a halogenated bisphenol system flame retardant, a halide system flame retardant, an antimony system flame retardant, a nitrogen system flame retardant, a boron system flame retardant, a metal salt system flame retardant, an inorganic system flame retardant, and a silicon system flame retardant. One thereof may be used singly, or a plurality thereof may be used by mixture. Specific examples of these other flame retardants are as follows.

Examples of organophosphate ester system flame retardants include triphenyl phosphate, methylneobenzyl phosphate, pentaerythritol diethyl diphosphate, methylneopentyl phosphate, phenyl neopentyl phosphate, pentaerythritol diphenyl diphosphate, dicyclopentyl hypodiphosphate, dineopentyl hypophosphate, phenyl pyrocatechol phosphate, ethyl pyrocatechol phosphate, and dipyrocatechol hypodiphosphate. One thereof may be used singly, or a plurality thereof may be used by mixture.

Examples of halogenated ester phosphate system flame retardants include tris (β-chloroethyl) phosphate, tris (dichloropropyl) phosphate, tris (β-bromoethyl) phosphate, tris (dibromopropyl) phosphate, tris (chloropropyl) phosphate, tris (dibromophenyl) phosphate, tris (tribromophenyl) phosphate, tris (tribromoneopentyl) phosphate, condensed polyphosphate, and condensed polyphosphonate. One thereof may be used singly, or a plurality thereof may be used by mixture.

Examples of inorganic phosphorus system flame retardants include red phosphorus and inorganic phosphate. One thereof may be used singly, or a plurality thereof may be used by mixture.

Examples of halogenated bisphenol system flame retardants include tetrabromo bisphenol A or an oligomer thereof and bis (bromoethyl ether) tetrabromo bisphenol A. One thereof may be used singly, or a plurality thereof may be used by mixture.

Examples of halide system flame retardants include decabromodiphenyl ether, hexabromobenzene, hexabromo cyclododecane, tetrabromo phthalic anhydride, (tetrabromo bisphenol) epoxy oligomer, hexabromo biphenyl ether, tribromo phenol, dibromo cresyl glycidyl ether, decabromo diphenyl oxide, halogenated polycarbonate, a halogenated polycarbonate copolymer, halogenated polystyrene, halogenated polyolefin, chlorinated paraffin, and perchlorocyclodecane. One thereof may be used singly, or a plurality thereof may be used by mixture.

Examples of antimony system flame retardants include antimony trioxide, antimony tetroxide, antimony pentoxide, and sodium antimonate. One thereof may be used singly, or a plurality thereof may be used by mixture.

Examples of nitrogen system flame retardants include melamine, an alkyl group, aromatic substituted melamine, melamine cyanurate, isocyanurate, melamine phosphate, triazine, a guanidine compound, urea, various cyanuric acid derivatives, and a phosphagen compound. One thereof may be used singly, or a plurality thereof may be used by mixture.

Examples of boron system flame retardants include zinc borate, zinc metaborate, and barium borate. One thereof may be used singly, or a plurality thereof may be used by mixture.

Examples of metal salt system flame retardants include an alkali metal salt and an alkali earth metal salt such as perfluoro alkane sulfonate, alkyl benzene sulfonate, halogenated alkyl benzene sulfonate, alkyl sulfonate, and naphthalene sulfonate. One thereof may be used singly, or a plurality thereof may be used by mixture.

Examples of inorganic system flame retardants include magnesium hydroxide, aluminum hydroxide, barium hydroxide, calcium hydroxide, dolomite, hydrotalcite, basic magnesium carbonate, zirconium hydroxide, or a hydrate of an inorganic metal compound such as a hydrate of tin oxide; a metal oxide such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide, and tungsten oxide; metal powder such as aluminum powder, iron (Fe) powder, copper (Cu) powder, nickel (Ni) powder, titanium (Ti) powder, manganese (Mn) powder, tin powder, zinc powder, molybdenum (Mo) powder, cobalt (Co) powder, bismuth (Bi) powder, chromium (Cr) powder, tungsten (W) powder, and antimony powder; carbonate such as zinc carbonate, magnesium carbonate, calcium carbonate, and barium carbonate; and talc such as hydrous silicate of magnesium. One thereof may be used singly, or a plurality thereof may be used by mixture. Specially, in light of fire retardancy and economy, magnesium hydroxide, aluminum hydroxide, talc, basic magnesium carbonate, mica, hydrotalcite, aluminum metal powder and the like are preferable. Since a used recycled material or mill ends generated in manufacturing a polymer contain the foregoing inorganic flame retardant, such a used recycled material or such mill ends may be used as an inorganic flame retardant.

Examples of silicon system flame retardants include a polyorgano siloxane resin (silicon, organic silicate or the like) and silica. One thereof may be used singly, or a plurality thereof may be used by mixture. Examples of polyorgano siloxane resins include a polymethyl ethyl siloxane, a polydimethyl siloxane resin, a polymethyl phenyl siloxane resin, a polydiphenyl siloxane resin, a polydiethyl siloxane resin, a polyethyl phenyl siloxane resin, and a mixture thereof. An alkyl group section of the foregoing polyorgano siloxane resin may be, for example, an alkoxy group, a hydroxyl group, an amino group, a carboxyl group, a silanol group, a mercapto group, an epoxy group, a vinyl group, an aryloxy group, a polyoxyalkylene group, a hydrogen group, or a functional group of halogen or the like. Otherwise, the alkyl group may further have a functional group. Specially, the alkyl group, the alkoxy group, the hydroxyl group, the vinyl group or the like is preferably contained. The weight average molecular weight of the polyorgano siloxane resin is preferably 100 or more, and is more preferably from 500 to 5000000 both inclusive. Further, the form thereof may be, for example, any of oil, varnish, gum, powder, and pellet. The silica is, for example, preferably provided with surface treatment with a silane coupling agent of a hydrocarbon compound.

The type and the necessary fire retardancy level of other flame retardants vary according to the resin type. The content of other flame retardant is generally from 0.001 wt % to 50 wt % both inclusive to a resin, preferably from 0.01 wt % to 30 wt % both inclusive to a resin, and more preferably from 0.1 wt % to 10 wt % both inclusive to a resin.

Further, the resin composition of matter may contain an inorganic filler, a drip inhibitor or the like as an additive according to needs in addition to the foregoing resin and the like. Thereby, fire retardancy and mechanical strength are further improved.

The inorganic filler contributes to improving mechanical strength and improving fire retardancy. Examples of inorganic fillers include, for example, known materials. Specific examples thereof include crystalline silica, molten silica, alumina, magnesia, talc, mica, kaolin, clay, diatom earth, silicate calcium, titanium oxide, glass fiber, calcium fluoride, calcium sulfate, barium sulfate, calcium phosphate, carbon fiber, carbon nanotube, and potassium titanate fiber. One thereof may be used singly, or a plurality thereof may be used by mixture. Specially, talc, mica, carbon, glass, or carbon nanotube is preferable. The content of the inorganic filler in the resin composition of matter is preferably from 0.1 wt % to 90 wt % both inclusive, more preferably from 0.5 wt % to 50 wt % both inclusive, and much more preferably from 1 wt % to 30 wt % both inclusive, since thereby high effect is obtained. More specifically, in the case where the content of the inorganic filler in the resin composition of matter is smaller than 0.1 wt %, effect of improving rigidity and fire retardancy of the resin composition of matter is easily lowered. Meanwhile, in the case where the content of the inorganic filler in the resin composition of matter is larger than 90 wt %, fluidity of the resin composition of matter molten in injection molding may be lowered or mechanical strength of the manufactured resin composition of matter may be lowered.

The drip inhibitor is intended to inhibit drip phenomenon at the time of combustion. Examples of drip inhibitors include a fluoroolefin resin. Specific examples of the fluoroolefin resins include a difluoropropylene polymer, a tetrafluoroethylene polymer, a tetrafluoroethylene-hexafluoropropylene copolymer, and a copolymer of tetrafluoroethylene and an ethylene system monomer. One thereof may be used singly, or a plurality thereof may be used by mixture. Specially, the tetrafluoro ethylene polymer is preferable, the average molecular weight is preferably 50000 or more, and more preferably from 100000 to 20000000 both inclusive. As the fluoroolefin resin, a fluoroolefin resin having fibrillar formation ability is more preferable. The content of the fluoroolefin resin in the resin composition of matter is preferably from 0.01 wt % to 5 wt % both inclusive, more preferably from 0.01 wt % to 2 wt % both inclusive, and much more preferably from 0.1 wt % to 0.5 wt % both inclusive, since thereby higher effect is obtained. More specifically, in the case where the content thereof is smaller than 0.001 wt %, drip phenomenon is hardly inhibited. Meanwhile, in the case where the content thereof is larger than 5 wt %, effect to inhibit drip phenomenon is saturated, and accordingly the cost becomes high, and mechanical strength and resin flowability are easily lowered.

Further, the resin composition of matter may contain, for example, an antioxidant (a phenol system antioxidant, a phosphorus system antioxidant, and sulfur system antioxidant), an antistatic additive, an ultraviolet absorber, a light stabilizer, a plasticizer, a solubilizer, a colorant (pigment and dye), an antibacterial agent, a hydrolysis inhibitor, a surface treatment agent or the like in addition to the foregoing additive. Thereby, injection molding property, impact resistance, appearance, heat resistance, weather resistance, rigidity and the like are improved.

The resin composition of matter is able to be manufactured as follows.

First, for example, the flame retardant including the internal layer 11 and the flame retardant factor layer 12 is manufactured by the foregoing manufacturing method. Subsequently, the resin, the flame retardant, and an additive and the like according to needs are mixed. At this time, for example, these materials are approximately uniformly dispersed by a kneading equipment such as a tumbler, a blender, a mixer, a push bench, and a kneading machine. Subsequently, the mixture is formed into a given shape (for example, a package or a member for various products such as home electric appliances, auto parts, information equipment, business equipment, telephones, stationery, furniture, and fiber) by a molding method such as injection molding, injection compression molding, extrusion molding, blow molding, vacuum molding, press molding, foam molding, and supercritical molding. Accordingly, the foregoing resin composition of matter is completed.

In the resin composition of matter, the foregoing flame retardant including the internal layer 11 and the flame retardant factor layer 12 is contained. Thus, when flame is approximated, temperature is increased and thereby the flame retardant is thermally decomposed. At this time, binding between the polymer and the sulfonate group or the sulfonate base is split off, and radical is generated. The radical is reacted to the resin, and carbonization (charring) at the section contacted with flame is promoted. A char layer generated by the carbonization covers the resin composition of matter, and thereby outside oxygen is blocked. Accordingly, combustion is stopped.

According to the resin composition of matter, the foregoing flame retardant including the internal layer 11 and the flame retardant factor layer 12 is contained. Thus, fire retardancy is able to be improved. Further, even if being exposed under high humidity environment, moisture absorption is inhibited, and fire retardancy is able to be secured stably for a long time. In this case, the inherent physical properties of the resin are also retained stably for a long time. Further, in the case where the content of the flame retardant is from 0.001 wt % to 10 wt % both inclusive, higher effect is able to be obtained.

Further, in the case where polycarbonate or a thermoplastic polymer mixture containing polycarbonate is contained as a resin, sufficient effect is able to be obtained.

Other action and other effect of the resin composition of matter are similar to those described in the foregoing flame retardant (flame retardant including the internal layer 11 and the flame retardant factor layer 12).

According to the method of manufacturing a resin composition of matter, the flame retardant including the internal layer 11 and the flame retardant factor layer 12 is contained in the resin composition of matter. Thus, the resin composition of matter which has superior fire retardancy and in which the fire retardancy is secured stably for a long time is able to be stably manufactured.

EXAMPLES

A description will be described in detail of examples of the present invention.

Example 1-1

Figure 3:
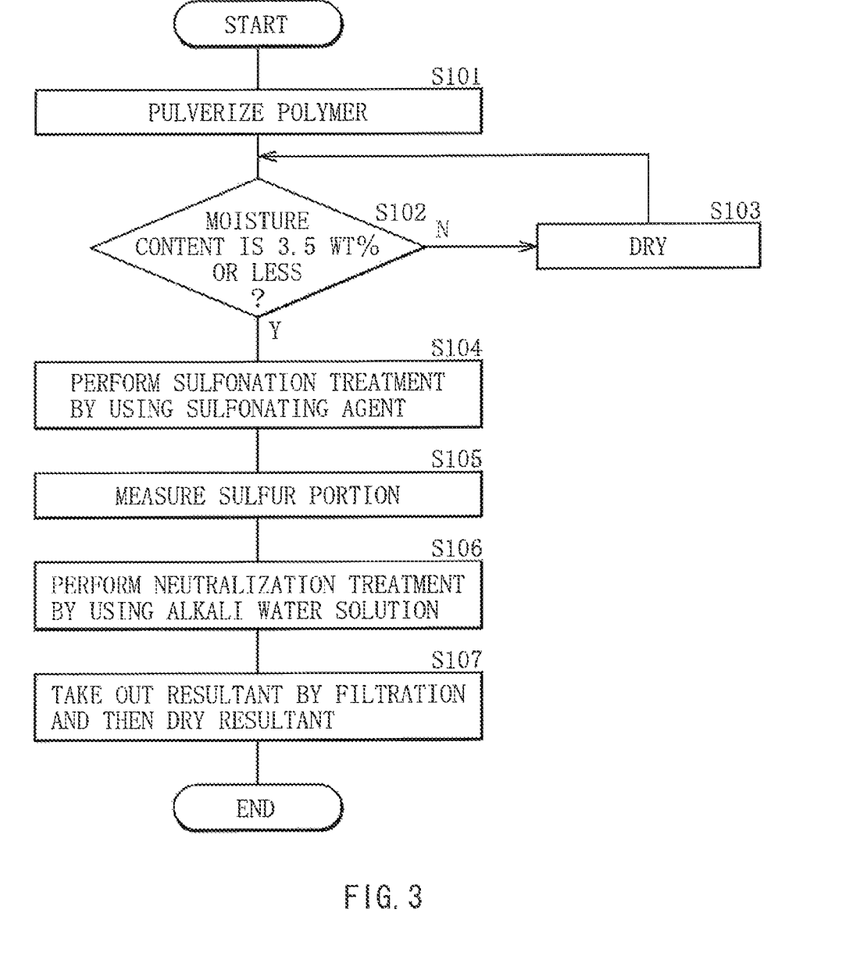
FIG. 3 is a flowchart illustrating a method of manufacturing the flame retardant according to the embodiment of the present invention.

The flame retardant of FIG. 1 was fabricated according to the flow of FIG. 3.

First, as a polymer, polystyrene (PS) pellets (weight average molecular weight: 210000, styrene unit: 100 mol %) were frozen-shattered with the use of liquid nitrogen by a laboratory crusher. After that, the resultant was powdered thorough 80 mesh screen. At this time, the moisture content in the powder matter was 3.9 wt %. The resultant was dried for 1 hour at 80 deg C. by a reduced-pressure dryer to obtain a powder matter having a moisture content of 0.12 wt %. The powder matter contained 99 wt % of particles being 80 mesh or less in size.

Subsequently, sulfonation treatment was performed by using the dried powder matter. In this case, 20 g of the powder matter was put into an egg plant-like flask, attached to a rotary evaporator, heated to 60 deg C., and rotated. At this time, the powder matter became a fluid in the egg plant-like flask by being rotated by the rotary evaporator. Next, inside of the flask was deaerated by a vacuum pump to hermetically seal the flask. Subsequently, by operating a valve, $SO_3$ gas was sent from a tank (filling amount: 1 g) of sulfur trioxide ($SO_3$) as a sulfonating agent that had been previously heated to 60 deg C. into the flask. At this time, due to injection of the $SO_3$ gas, the pressure inside the flask immediately became normal pressure. However, as reaction was progressed, the pressure inside the flask gradually became back to the reduced pressure state. Thus, the $SO_3$ gas was injected again. By repeating such an operation several times, 1 g in total of the $SO_3$ gas was injected into the flask, and reaction was made for 4 hours at 60 deg C., and thereby a reactant was obtained. After that, the $SO_3$ gas in the flask was substituted with nitrogen.

Subsequently, a potassium hydrate water solution was put into the flask to neutralize the reactant (adjusted to pH7.0). Finally, the reactant neutralized was filtered with a glass filter, and the filtered resultant was washed with water. After filtering was made again, the resultant was dried by a circulation type drier (100 deg C.) to obtain 21 g of a flame retardant (white powder).

Figure 4:
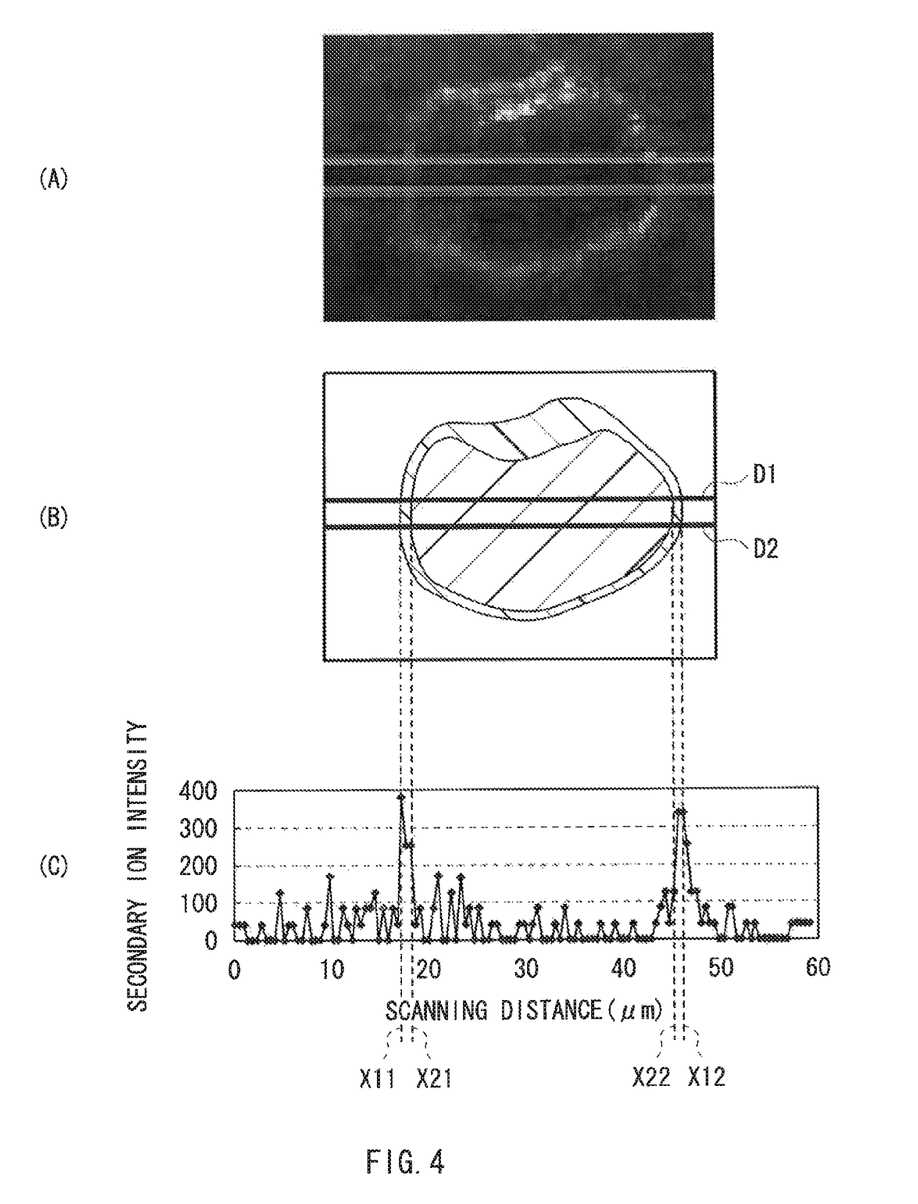
FIG. 4 illustrates a photograph obtained by imaging a cross section of a flame retardant of Example 1-1 from a secondary ion intensity, a schematic view thereof, and a distribution of a secondary ion intensity.

For the flame retardant, the sulfur portion was analyzed. In result, the occupancy ratio of sulfur in the sulfonate group or the like to the flame retardant (S ratio in the sulfonate group or the like) was 1.5 wt %. Further, after a cross section of the flame retardant was measured by using TOF-SIMS, the result illustrated in FIG. 4 was obtained. FIG. 4(A) illustrates a result obtained by imaging a cross section of the flame retardant from a secondary ion intensity of sulfur element in the cross section of the flame retardant. FIG. 4(B) schematically illustrates FIG. 4(A). FIG. 4(C) illustrates a distribution of the secondary ion intensity of sulfur element in the region sandwiched between two green lines, that is, in the region sandwiched between lines D1 and D2 of FIG. 4(B). The scanning distances X11 and X12 illustrated in FIG. 4(C) represent outer edges of the flame retardant, and the scanning distances X21 and X22 represent positions of an interface between the flame retardant factor layer 12 and the internal layer 11. Accordingly, it was confirmed that the flame retardant factor layer 12 was formed by binding the potassium sulfonate base to the surface layer section of the flame retardant. Further, in this case, the thickness ratio of the flame retardant factor layer 12 was 6.7% to the particle diameter of the flame retardant.

Further, the foregoing analysis of sulfur portion and the foregoing measurement by using TOF-SIMS were similarly performed in the following examples and the following comparative examples.

Example 1-2

A procedure similar to that of Example 1-1 was performed, except that an acrylonitrile-styrene copolymer (AS) was used as a polymer. At this time, frost shattering was performed by using recycled pellet of transparent reel waste material of a used business video cassette tape (weight average molecular weight (polystyrene conversion: 110000, acrylonitrile unit: 43 mol %, styrene unit: 57 mol %) as AS. In result, the moisture content of the obtained powder matter was 5.7 wt %. The resultant was dried for 1 hour at 100 deg C. by the reduced-pressure dryer to obtain powder matter having a moisture content of 0.25 wt %. The powder matter contained 98 wt % of particles being 80 mesh or less in size. By using the dried powder matter, sulfonation treatment was performed by a procedure similar to that of Example 1-1. After that, a flame retardant (pale yellow powder) was obtained.

For the flame retardant, the sulfur portion was analyzed. In result, the S ratio in the sulfonate group or the like was 0.87 wt %. Further, after a cross section of the flame retardant was measured by using TOF-SIMS, it was confirmed that the flame retardant factor layer 12 was formed by binding the potassium sulfonate base to the surface layer section of the flame retardant. Further, in this case, the thickness ratio of the flame retardant factor layer 12 was 8.5% to the particle diameter of the flame retardant.

Example 1-3

A procedure similar to that of Example 1-1 was performed, except that recycled pellets of recycled foamed polystyrene as PS (weight average molecular weight: 220000, styrene unit: 100 mol %) was used as a polymer. At this time, after frost shattering was performed, the moisture content of the obtained powder matter was 3.4 wt %. The powder matter contained 99 wt % of particles being 80 mesh or less in size. By using the powder matter, sulfonation treatment was performed by a procedure similar to that of Example 1-1. After that, a flame retardant (pale yellow powder) was obtained.

For the flame retardant, the sulfur portion was analyzed. In result, the S ratio in the sulfonate group or the like was 0.63 wt %. Further, after a cross section of the flame retardant was measured by using TOF-SIMS, it was confirmed that the flame retardant factor layer 12 was formed by binding the potassium sulfonate base to the surface layer section of the flame retardant. Further, in this case, the thickness ratio of the flame retardant factor layer 12 was 4.8% to the particle diameter of the flame retardant.

Comparative Example 1-1

A flame retardant was fabricated by dissolving a polymer in an organic solvent to perform sulfonation treatment. At this time, the dried powder matter (moisture content: 0.12 wt %) of Example 1-1 was used as a polymer. In this case, 20 g of the powder matter was put into a round flask containing 180 g of 1,2-dichloroethane as an organic solvent, and dissolved. A complex of 150 g of 1,2-dichloroethane, 6.5 g of triethyl phosphate, and 15 g of liquid $SO_3$ was dropped into the round flask for 1.5 hours at room temperature. After dropping, the resultant was matured at 60 deg C. for 2 hours. Thereby, sulfonation treatment was performed. Subsequently, the reactant was taken out and dissolved in methanol. After that, the resultant was neutralize with the use of a potassium hydroxide water solution. By adding diethyl ether to the solution, precipitation was made to obtain a white solid. After that, the resultant was dried by a circulation type drier (100 deg C.) to obtain 25 g of a flame retardant.

Figure 5:
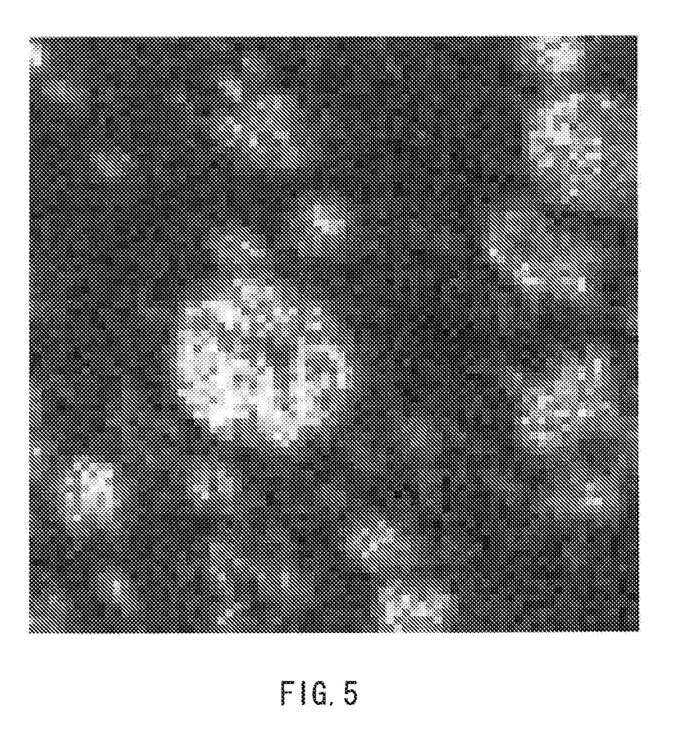
FIG. 5 is a photograph obtained by imaging a cross section of a flame retardant of Comparative example 1-1 from a secondary ion intensity.

For the flame retardant, the sulfur portion was analyzed. In result, the S ratio in the sulfonate group or the like was 13.2 wt %. Further, after a cross section of the flame retardant was measured by using TOF-SIMS, the result illustrated in FIG. 5 was obtained. FIG. 5 illustrates a result obtained by imaging a cross section of the flame retardant from a secondary ion intensity of sulfur element in the cross section of the flame retardant. Each orange image illustrates each particle. Accordingly, it was confirmed that the potassium sulfonate base was introduced into the whole flame retardant, and the flame retardant factor layer 12 and the internal layer 11 were not formed. That is, the ratio of a region into which the potassium sulfonate base was introduced was 100% to the particle diameter of the flame retardant.

Comparative Example 1-2

A commercially available polystyrene sulfonated soda (weight average molecular weight: 70000) was used as a flame retardant. For the flame retardant, the sulfur portion was analyzed. In result, the S ratio in the sulfonate group or the like was 15.3 wt %. Further, after a cross section of the flame retardant was measured by using TOF-SIMS, it was confirmed that the sodium sulfonate base was introduced into the whole flame retardant, and the flame retardant factor layer 12 and the internal layer 11 were not formed. That is, the ratio of a region into which the sodium sulfonate base was introduced was 100% to the particle diameter of the flame retardant.

Comparative Example 1-3

A procedure similar to that of Example 1-1 was performed, except that the powder matter before being dried (moisture content: 3.9 wt %) was used. For the obtained flame retardant (white powder), the sulfur portion was analyzed. In result, the S ratio in the sulfonate group or the like was 0.08 wt %. Further, after a cross section of the flame retardant was measured by using TOF-SIMS in the same manner as that of Example 1-1, sulfur secondary ion was not detected, and introduction of the potassium sulfonate base was not confirmed.

Comparative Example 1-4

A procedure similar to that of Example 1-2 was performed, except that the powder matter before being dried (moisture content: 5.7 wt %) was used. For the obtained flame retardant (white powder), the sulfur portion was analyzed. In result, the S ratio in the sulfonate group or the like was 0.04 wt %. Further, after a cross section of the flame retardant was measured by using TOF-SIMS, sulfur secondary ion was not detected, and introduction of the potassium sulfonate base was not confirmed.

For the flame retardants of Examples 1-1 to 1-3 and Comparative examples 1-1 to 1-4, hygroscopic test was performed. The results illustrated in Table 1 were obtained.

In performing the hygroscopic test, after the flame retardants were left for 24 hours at room temperature, fluidity and adhesion condition between particles were evaluated. If no change was observed, it was evaluated as "o." If blocking was generated, it was evaluated as "x." Further, the weight before being left and the weight after being left were measured, and the weight increase ratio (%) was obtained.

TABLE 1

|  | Powder matter | | | S ratio in | Thickness ratio | Hygroscopic property | |
| --- | --- | --- | --- | --- | --- | --- | --- |
|  | Polymer | Moisture content (wt %) | Sulfonation treatment method | sulfonate group or the like (wt %) | of flame retardant factor layer (%) | Fluidity or the like | Weight increase ratio (%) |
| Example 1-1 | PS | 0.12 | FIG. 3 | 1.5 | 6.7 | o | <1 |
| Example 1-2 | AS | 0.25 | FIG. 3 | 0.87 | 8.5 | o | <1 |
| Example 1-3 | PS | 3.4 | FIG. 3 | 0.63 | 4.8 | o | <1 |
| Comparative example 1-1 | PS | 0.12 | dissolved in organic solvent | 13.2 | — | x | ≥10 |
| Comparative example 1-2 | PS | — | — | 15.3 | — | x | ≥10 |
| Comparative example 1-3 | PS | 3.9 | FIG. 3 | 0.08 | — | o | <1 |
| Comparative example 1-4 | AS | 5.7 | FIG. 3 | 0.04 | — | o | <1 |

As illustrated in FIG. 1, in Examples 1-1 to 1-3 in which the sulfonate group or the like was introduced onto the surface layer section, blocking is not generated, and the weight increase ratio was under 1%. Meanwhile, in Comparative examples 1-1 and 1-2 in which the sulfonate group or the like was introduced into the inside of the particles, blocking was generated and the weight increase ratio was 10% or more. The result showed the following. That is, in the case where the sulfonate group or the like was introduced into the surface layer section, moisture absorption was inhibited without relation to the polymer type. Meanwhile, in the case where the sulfonate group or the like was introduced into the inside of the particles, moisture becomes easily absorbed, and thus particles became easily adhered to each other.

Further, in sulfonation treatment, in Examples 1-1 to 1-3 in which the flame retardant was fabricated by using the powder matter with a moisture content of 3.5 wt % or less, the flame retardant factor layer 12 was formed. However, in Comparative examples 1-3 and 1-4 in which the flame retardant was fabricated by using the powder matter with a moisture content exceeding 3.5 wt %, the flame retardant factor layer 12 was not formed. The result showed that in the case where the moisture content exceeded 3.5 wt % or more, moisture adhered to the powder matter surface inhibits sulfonation reaction without relation to the polymer type. In Comparative examples 1-3 and 1-4, since the sulfonate group or the like was not almost introduced, blocking was not generated, and the weight increase ratio was under 1%.

Accordingly, it was confirmed that in the flame retardant containing the particulate polymer, when at least one of the sulfonate group and the sulfonate base was bonded to the surface layer section of the polymer to form the flame retardant factor layer 12, moisture absorption was inhibited. In this case, it was confirmed that if the moisture content was 3.5 wt % or less and the particulate polymer was sulfonated, the flame retardant of the present invention was able to be manufactured. Furthermore, it was indicated that in this case, the flame retardant of the present invention was able to be manufactured stably with no variation.

Though not shown in these examples, in the case where the occupancy ratio of sulfur in the sulfonate group or the like to the whole flame retardant exceeded 5 wt %, or the thickness ratio of the flame retardant factor layer 12 exceeded 50%, blocking was not generated. However, it was confirmed that in the case where the occupancy ratio of sulfur in the sulfonate group or the like to the flame retardant was 5 wt % or less, or the thickness ratio of the flame retardant factor layer 12 was 50% or less, moisture absorption was more inhibited, and stability was high.

Example 2-1

As a specific example of the resin composition of matter described in the foregoing embodiment, pellets and a strip specimen composed of the resin composition of matter were fabricated.

99.5 parts by mass of versatile grade middle molecular weight polycarbonate (PC (M), weight average molecular weight (GPC method, polyethylene conversion): 43,000) as a resin, 0.2 parts by mass of the flame retardant of Example 1-1 (sulfone system), and 0.3 parts by mass of polytetrafluoroethylene (PTFE) having fibrillar formation ability as a drip inhibitor were mixed to prepare a resin composition of matter precursor. Subsequently, the resin composition of matter precursor was supplied to a push bench, kneaded at given temperature, and thereby was formed into pellets. Subsequently, the pellets were put into an injection molding machine and was injection-molded at given temperature. Thereby, a strip specimen composed of the resin composition of matter having a thickness of 1.6 mm was completed.

Examples 2-2 and 2-3

A procedure similar to that of Example 2-1 was performed, except that the flame retardant of Example 1-2 (sulfone system: Example 2-2) or the flame retardant of Example 1-3 (sulfone system: Example 2-3) was used instead of the flame retardant of Example 1-1.

Example 2-4

A procedure similar to that of Example 1-1 was performed, except that as a resin, low molecular weight polycarbonate (PC (L)) of a waste DVD (with used coating film, weight average molecular weight (GPC method, polyethylene conversion): 32,000) was added. At this time, the composition of the resin composition of matter precursor (PC (M):PC (L):sulfone system:PTFE) was 69.5:30:0.2:0.3 at a weight ratio.

Example 2-5

A procedure similar to that of Example 2-2 was performed, except that a compound-use grade acrylonitrile-butadiene-styrene copolymer (ABS, acrylonitrile:polybutadiene:styrene=17:32:51 at a weight ratio) as a resin, a silicon flame retardant (Si system: methylphenyl solid silicon resin), and talc as an inorganic filler were added to change the composition of the resin composition of matter precursor. At this time, the composition of the resin composition of matter precursor (PC (M):ABS:sulfone system: Si system: PTFE:talc) was 82.5:5:1.0:1.0:0.5:10 at a weight ratio.

Example 2-6

A procedure similar to that of Example 2-5 was performed, except that a low molecular PC as a resin was added to change the composition of the resin composition of matter precursor. At this time, the composition of the resin composition of matter precursor (PC (M):PC (L):ABS:sulfone system: Si system: PTFE:talc) was 48.5:30:7.5:1.0:0.1:0.4:12.5 at a weight ratio.

Comparative Examples 2-1 to 2-4

A procedure similar to that of Example 2-1 was performed, except that the flame retardant of Comparative example 1-1 (Comparative example 2-1), the flame retardant of Comparative example 1-2 (Comparative example 2-2), the flame retardant of Comparative example 1-3 (Comparative example 2-3), or the flame retardant of Comparative example 1-4 (Comparative example 2-4) was used instead of the flame retardant of Example 1-1.

Comparative Example 2-5

A procedure similar to that of Example 2-4 was performed, except that the flame retardant of Comparative example 1-1 was used instead of the flame retardant of Example 1-1.

Comparative Examples 2-6 and 2-7

A procedure similar to that of Example 2-5 (Comparative example 2-6) or Example 2-6 (Comparative example 2-7) was performed, except that the flame retardant of Comparative example 1-1 was used instead of the flame retardant of Example 1-2.

For the pellets and the test specimens composed of the resin composition of matters of Examples 2-1 to 2-6 and Comparative examples 2-1 to 2-7, combustibleness test, characteristics evaluation after being stored at high temperature and high humidity, and recycle characteristics evaluation were performed. The result illustrated in Table 2 was obtained.

In the combustibleness test, vertical combustibleness test was performed according to standards V-0, V-1, and V-2 of UL94 (underwriters laboratory subject 94) by using the test specimens. As evaluation results of combustibleness, in the case where a test specimen passed the standard(s), such a test specimen was evaluated as V-0, V-1, or V-2 corresponding to the passed standard(s). Meanwhile, in the case where a test specimen did not pass the standard V-2, such a test specimen was evaluated as "x." For the standards V-0, V-1, and V-2 of UL94, specifically, evaluation was made by the following procedure. First, five pieces of test specimens were prepared. Burner flame was applied to a strip specimen supported in an approximately vertical state from the bottom side to retain such a state for 10 seconds. After that, the burner flame was detached from the strip specimen. When the flame was distinguished, the burner flame was immediately applied to the strip specimen for another 10 seconds, and then the burner flame was detached from the strip specimen. At this time, evaluation was made according to the flammable duration after the first and the second flame applications, the total of the flammable combustion duration and the flameless combustion duration after the second flame application, the total of the flammable combustion durations of all five test specimens, and presence of combustion droppings. In this case, the standard V-0 represented a case that the first and the second flammable combustions were finished within 10 seconds, and the standards V-1 and V-2 represented a case that the first and the second flammable combustions were finished within 30 seconds. Further, the total of the flammable combustion duration and the flameless combustion duration after the second flame application was within 30 seconds for the standard V-0, and within 60 seconds for the standards V-1 and V-2. Further, the total of the flammable combustion durations of all five test specimens was within 50 seconds for the standard V-0, and within 250 seconds for the standards V-1 and V-2. Furthermore, combustion droppings were tolerable only for the V-2 standard. That is, in the UL combustibleness test method (UL94), combustibleness was increased in the order of the standards V-0, V-1, and V-2.

In characteristics evaluation after being stored at high temperature and high humidity, the test specimens were exposed in the atmosphere in which the temperature was 80 deg C. and the relative humidity (RH) was 80% for four weeks. After that, evaluation was made according to the appearance change, the molecular weight retention ratio, and the combustibleness test. For the appearance change, comparison was made with the appearance before being stored at high temperature and high humidity, and evaluation was visually made on presence of generation of haze, it was evaluated as "o" if no change was observed, and "x" if haze was generated. The molecular weight retention ratio was calculated from the ratio (%) of the weight average molecular weight after being stored to the weight average molecular weight before being stored. The combustibleness test was performed in the same manner as the foregoing combustibleness test by using the test specimen being after stored.

In evaluating recycle characteristics, by repeatedly performing pelletization, the retention ratio of Izod impact strength (JIS K7100) was obtained. First, Izod impact strength was measured by using a test specimen (initial strength). Next, after the test specimen was pulverized, the resultant was supplied to a push bench, was kneaded at 280 deg C., and thereby was pelletized. After such a step was repeated five times in total, the pellets were put into an injection molding machine and was injection-molded at given temperature. Thereby, a strip specimen composed of the resin composition of matter having a thickness of 1.6 mm was fabricated again. The Izod impact strength of the test specimen was measured (strength after being re-pelletized). Based on the ratio (%) of the strength after being re-pelletized to the initial strength, the strength retention ratio was calculated.

even if being exposed under high humidity environment, the inherent physical properties of the resin were retained stably for a long time, and fire retardancy was secured. Further,

TABLE 2

| | Resin (wt %) | | | Flame retardant | | Si system (wt %) | Additive (wt %) | | Combustible-ness evaluation (UL94) | Appearance | After being stored at high temperature and high humidity | | Strength retention ratio (%) |
| | | | | | | | | | | | Molecular weight storage ratio (%) | Combustible-ness evaluation (UL94) | |
| | PC (M) | PC (L) | ABS | Sulfonate system Type | wt % | | PTFE | Talc | | | | | |
|---|---|---|---|---|---|---|---|---|---|---|---|---|---|
| Example 2-1 | 99.5 | — | — | Example 1-1 | 0.2 | — | 0.3 | — | V-0 | ○ | >98 | V-0 | >98 |
| Example 2-2 | 99.5 | — | — | Example 1-2 | 0.2 | — | 0.3 | — | V-0 | ○ | >98 | V-0 | >98 |
| Example 2-3 | 99.5 | — | — | Example 1-3 | 0.2 | — | 0.3 | — | V-0 | ○ | >98 | V-0 | >98 |
| Example 2-4 | 69.5 | 30 | — | Example 1-1 | 0.2 | — | 0.3 | — | V-0 | ○ | >98 | V-0 | >98 |
| Example 2-5 | 82.5 | — | 5 | Example 1-2 | 1 | 1 | 0.5 | 10 | V-0 | — | >98 | V-0 | >98 |
| Example 2-6 | 48.5 | 30 | 7.5 | Example 1-2 | 1 | 0.1 | 0.4 | 12.5 | V-0 | — | >98 | V-0 | >98 |
| Comparative example 2-1 | 99.5 | — | — | Comparative example 1-1 | 0.2 | — | 0.3 | — | V-0 | x | 90 | V-1 | 85 |
| Comparative example 2-2 | 99.5 | — | — | Comparative example 1-2 | 0.2 | — | 0.3 | — | V-1 | x | 85 | V-2 | 78 |
| Comparative example 2-3 | 99.5 | — | — | Comparative example 1-3 | 0.2 | — | 0.3 | — | V-2 | ○ | >98 | V-2 | >98 |
| Comparative example 2-4 | 99.5 | — | — | Comparative example 1-4 | 0.2 | — | 0.3 | — | V-2 | ○ | >98 | V-2 | >98 |
| Comparative example 2-5 | 69.5 | 30 | — | Comparative example 1-1 | 0.2 | — | 0.3 | — | V-1 | x | 82 | V-1 | 71 |
| Comparative example 2-6 | 82.5 | — | 5 | Comparative example 1-2 | 1 | 1 | 0.5 | 10 | V-1 | — | 71 | V-2 | 65 |
| Comparative example 2-7 | 48.5 | 30 | 7.5 | Comparative example 1-2 | 1 | 0.1 | 0.4 | 12.5 | V-2 | — | 68 | V-2 | 61 |

As illustrated in Table 2, in Examples 2-1 to 2-3 in which the flame retardants of Examples 1-1 to 1-3 were contained, the combustibleness evaluation was V-0, the appearance after being stored at high temperature and high humidity and the like were favorably retained, and the strength retention ratio was increased as high as a value exceeding 98%. Meanwhile, in Comparative examples 2-1 and 2-2 in which the flame retardants of Comparative examples 1-1 and 1-2 were contained, though the combustibleness evaluation was V-0 or V1, the appearance evaluation after being stored at high temperature and high humidity and the like were significantly deteriorated, and the strength retention ratio was significantly decreased as low as a value 85% or less. The result showed that in the case where the flame retardants including the flame retardant factor layer 12 of Examples 1-1 to 1-3 were contained, dispersibility and compatibility were improved, and moisture absorption was inhibited. In Comparative examples 2-3 and 2-4 in which the flame retardants of Comparative examples 1-3 and 1-4 were contained, though the appearance and the molecular weight retention ratio after being stored at high temperature and high humidity and the strength retention ratio were similar to those of Examples 2-1 to 2-3, the combustibleness evaluation and the combustibleness evaluation after being stored at high temperature and high humidity were V-2. That is, in the flame retardants of Comparative examples 1-3 and 1-4, since the sulfonate group or the like was not introduced, the combustibleness evaluation was low, and by just that much, moisture absorption was low, and deterioration of the appearance after being stored at high temperature and high humidity and the like were not generated.

Accordingly, it was confirmed that in the resin composition of matter, in the case where the foregoing flame retardant was contained, the fire retardancy was improved, high recycle characteristics were also confirmed. In this case, since the foregoing flame retardant hardly absorbs moisture, handling characteristics were improved, and dispersiveness was improved and superior compatibility was obtained in forming the resin composition of matter.

Further, in Examples 2-4 to 2-6 in which as a resin, the flame retardants of Examples 1-1 and 1-2 were contained together with the low molecular weight PC, ABS or the like, the combustibleness evaluation was V-0, the appearance after being stored at high temperature and high humidity and the like were favorably retained, and the strength retention ratio was increased as high as a value exceeding 98%. Meanwhile, in Comparative examples 2-5 to 2-7 in which as a resin, the flame retardants of Comparative examples 1-1 and 1-2 were contained together with the low molecular weight PC, ABS or the like, the combustibleness evaluation was low (V-1 or V2), the appearance after being stored at high temperature and high humidity and the like were significantly deteriorated, and the strength retention ratio was significantly decreased as low as a value about 70% or less. For Examples 2-5 and 2-6 and Comparative examples 2-6 and 2-7, the appearance change was not evaluated.

Accordingly, it was confirmed that in the resin composition of matter, in the case where the flame retardant of the present invention was contained, without relation to the resin type and the additive, fire retardancy was improved, the inherent physical properties of the resin were retained stably for a long time, and fire retardancy was secured. Further, high recycle characteristics were also confirmed.

Though not illustrated in these examples, even if the content of the flame retardant of the present invention in the resin composition of matter exceeded 10 wt %, high fire retardancy and long-term stability were obtained. However, it was confirmed that in the case where the content of the flame retardant of the present invention in the resin composition of matter was 10 wt % or less, superior fire retardancy and the inherent physical properties of the resin were secured.

While the invention has been described of the flame retardant, the method of manufacturing the same, the resin composition of matter, and the method of manufacturing the same of the present invention with reference to the embodiment and the examples. However, the present invention is not limited to the aspects described in the foregoing embodiment and the foregoing examples. The structures of the flame retardant, the method of manufacturing the same, the resin composition of matter, and the method of manufacturing the same may be freely modified.

Specifically, in the foregoing embodiment and the foregoing examples, in the flame retardant, one layer of the flame retardant factor layer 12 is provided in the surface layer section. However, in the present invention, the structure of the flame retardant is not limited thereto, but for example, a flame retardant in which two or more layers of the flame retardant factor layer 12 are provided may be adopted.

Further, in the foregoing embodiment and the foregoing examples, the description has been given of a case in which TOF-SIMS is used in obtaining the thickness ratio of the flame retardant factor layer 12. However, the thickness ratio of the flame retardant factor layer 12 may be obtained by other method.

Further, in the foregoing embodiment and the foregoing examples, the description has been given of the moisture content or the like of the polymer in the method of manufacturing a flame retardant of the present invention with reference to the numerical value range derived from the results of the examples as an appropriate range. However, the foregoing description does not totally deny possibility that the content or the like might be out of the foregoing range. That is, the foregoing appropriate range is only a particularly preferably range in order to obtain effect of the present invention. As long as the effect of the present invention is obtained, the ratio and the content may be somewhat out of the foregoing range.

The invention claimed is:

1. A method of manufacturing a flame retardant, comprising:
   pulverizing a thermoplastic polymer material having (a) a polystyrene, a high impact polystyrene, or both, and (b) a weight average molecular weight from 5000 to 20000000, both inclusive, and producing the particulate thermoplastic polymer 30 wt % or more of which is particles of 60 mesh or less in size and 10 wt % or more of which is particles of 80 mesh or less in size and having a moisture content of 3.5 wt % or less;
   sulfonating the particulate thermoplastic polymer within a container by first deaerating an interior of the container containing the particulate thermoplastic polymer by placing the interior of the container at a pressure less than atmospheric pressure, and then introducing a gaseous sulfonating agent at or above a boiling temperature of sulfur trioxide into the interior of the container; and
   producing at least one flame retardant particle having an internal layer and a flame retardant factor layer that covers at least a surface section of the internal layer with (a) a sulfonate group, a sulfonate base, or both bonded to the surface section of the internal layer, and (b) a ratio of a thickness of the flame retardant factor layer to a particle diameter of the flame retardant particle of 10% or less, where a position of an interface between the flame retardant factor layer and the internal layer is defined as where a 50% value of a maximum value of secondary ion intensity of a sulfur element in the flame retardant factor layer occurs as measured using TOF-SIMS in a cross sectional structure of the flame retardant particle.

2. The method of claim 1, comprising reducing the moisture content of the particulate thermoplastic polymer from more than 3.5 wt % to 3.5 wt % or less prior to the step of the sulfonating of the particulate thermoplastic polymer.

3. The method of claim 1, wherein sulfonation is performed so that an occupancy ratio of sulfur (S) in the sulfonate group, the sulfonate base, or both to the whole flame retardant becomes from 0.1 wt % to 5 wt % both inclusive.

4. The method of claim 1, wherein the sulfonate group or the sulfonate base is, or both are, bonded more in the flame retardant factor layer than in the internal layer.

5. The method of claim 1, the sulfonating agent is sulfur trioxide.

6. The method of claim 1, wherein the particulate thermoplastic polymer is the polystyrene.

7. The method of claim 1, wherein the particulate thermoplastic polymer is the high impact polystyrene.

8. The method of claim 1, wherein the particulate thermoplastic includes both the polystyrene and the high impact polystyrene.

9. The method of claim 1, wherein the sulfonating agent is sulfur trioxide, fuming sulfuric acid, chlorosulfonic acid, concentrated sulfuric acid, polyalkylbenzene sulfone acid, or any combination of them.

10. The method of claim 1, wherein the weight average molecular weight of the thermoplastic polymer is from 10000 to 1000000, both inclusive.

11. The method of claim 10, wherein the weight average molecular weight of the thermoplastic polymer is from 50000 to 500000, both inclusive.

12. The method of claim 1, wherein the pulverizing uses frost shattering using liquid nitrogen.

13. A method of manufacturing a flame retardant, comprising:
   pulverizing a thermoplastic polymer material having (a) a polystyrene, a high-impact polystyrene, or both, and (b) a weight average molecular weight from 5000 to 20000000, both inclusive, and producing a particulate thermoplastic polymer 30 wt % or more of which is particles of 60 mesh or less in size and 10 wt % or more of which is particles of 80 mesh or less in size and having a moisture content of 3.5 wt % or less;
   sulfonating the particulate thermoplastic polymer within a container by first subjecting the particulate thermoplastic polymer to evaporation at 60 degrees Celsius while the particulate thermoplastic polymer is imparted with kinetic energy to become fluidized, second deaerating an interior of the container containing the particulate thermoplastic polymer by placing the interior of the container at a pressure less than atmospheric pressure, and third introducing a gaseous sulfonating agent preheated to at above a boiling temperature of sulfur trioxide into the interior of the container; and
   producing a flame retardant particle having an internal layer and a flame retardant factor layer that covers a surface of the internal layer with (a) a sulfonate group, a sulfonate base, or both bonded to the surface of the internal layer, (b) an occupancy ratio of sulfur (S) in the sulfonate group, the sulfonate base, or both to the whole flame retardant of from 0.1 wt % to 5 wt % both inclusive, and (c) a ratio of a thickness of the flame retardant factor layer to a particle diameter of the flame retardant particle of 10% or less, where a position of an interface between the flame retardant factor layer and the internal layer is defined as where a 50% value of a maximum value of secondary ion intensity of a sulfur element in the flame retardant factor layer occurs as measured using TOF-SIMS in a cross sectional structure of the flame retardant particle.

14. The method of claim 13, wherein the particulate thermoplastic polymer is the polystyrene.

15. The method of claim 13, wherein the particulate thermoplastic polymer is the high impact polystyrene.

16. The method of claim 13 wherein the particulate thermoplastic polymer includes a combination of the polystyrene and the high impact polystyrene.

17. The method of claim 13, the sulfonating agent is sulfur trioxide.

18. The method of claim 13, wherein the sulfonating agent is sulfur trioxide, fuming sulfuric acid, chlorosulfonic acid, concentrated sulfuric acid, polyalkylbenzene sulfone acid, or any combination of them.

19. The method of claim 13, wherein the weight average molecular weight of the thermoplastic polymer is from 10000 to 1000000, both inclusive.

20. The method of claim 13, wherein the weight average molecular weight of the thermoplastic polymer is from 50000 to 500000, both inclusive.

* * * * *